(12) United States Patent
Lemonds et al.

(10) Patent No.: US 8,868,633 B2
(45) Date of Patent: Oct. 21, 2014

(54) METHOD AND CIRCUITRY FOR SQUARE ROOT DETERMINATION

(75) Inventors: Carl E. Lemonds, Austin, TX (US); Jay E. Fleischman, Fort Collins, CO (US); David M. Russinoff, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 389 days.

(21) Appl. No.: 13/436,555

(22) Filed: Mar. 30, 2012

(65) Prior Publication Data

US 2013/0262541 A1 Oct. 3, 2013

(51) Int. Cl.
*G06F 7/552* (2006.01)
(52) U.S. Cl.
USPC .......................................... 708/605
(58) Field of Classification Search
None
See application file for complete search history.

(56) References Cited

U.S. PATENT DOCUMENTS

| | | | | |
|---|---|---|---|---|
| 6,349,319 B1* | 2/2002 | Shankar et al. | ............... | 708/500 |
| 7,016,930 B2* | 3/2006 | Hinds et al. | ................... | 708/650 |
| 7,243,119 B1* | 7/2007 | Yamada et al. | ............... | 708/650 |
| 2006/0129623 A1* | 6/2006 | Uesugi | ......................... | 708/490 |
| 2007/0118584 A1* | 5/2007 | Lee | ............................... | 708/504 |
| 2013/0262541 A1* | 10/2013 | Lemonds et al. | ............ | 708/235 |

\* cited by examiner

*Primary Examiner* — David H Malzahn
(74) *Attorney, Agent, or Firm* — Volpe and Koenig, P.C.

(57) ABSTRACT

A method, performed by a processor, of determining a square root using a single processor cycle per iteration is described. The method includes, in a single cycle: obtaining, from a stored lookup table, a quotient digit and a square of the quotient digit; retrieving a current solution; and determining a new solution using the current solution and the quotient digit. Circuitry configured to perform the method is described.

21 Claims, 4 Drawing Sheets

METHOD AND CIRCUITRY FOR SQUARE ROOT DETERMINATION

FIELD OF THE INVENTION

The present invention is generally directed to electronic computation and, in particular, to electronic computation of square roots.

BACKGROUND

A known method for binary division and square root determination (both fixed-point and floating-point) is the SRT method named after Sweeney, Robertson, and Tocher, who independently came up with the algorithm circa 1958. SRT is an iterative method, based on the recurrence equation:

$$P_{i+1} = r \cdot P_i - q_{i+1} \cdot (2Q_i + q_{i+1} \cdot r^{(i+1)}) \quad \text{(Equation 1)}$$

where $P_i$ is a current partial remainder; $P_{i+1}$ is a new partial remainder; $q_{i+1}$ is the next quotient digit, an additional digit of precision to the accumulated approximate solution $Q_i$; and r is a radix. $Q_i$ is an approximate solution in a current iteration. Previous implementations of square root determination based on Equation 1 have required two processor cycles per iteration: one cycle to read $q_{i+1}$ from a lookup table and compute $2Q_i + q_{i+1} \cdot r^{(i+1)}$, and then another to multiply this term by $q_{i+1}$.

SUMMARY OF EMBODIMENTS

A method, performed by a processor, of determining a square root using a single processor cycle per iteration is described. The method comprises, in a single cycle, obtaining, from a stored lookup table, a quotient digit and the square of that quotient digit; retrieving a current (approximate) solution; and determining a new solution using the current solution and the quotient digit. Circuitry configured to perform the method is also described.

BRIEF DESCRIPTION OF THE DRAWINGS

A more detailed understanding may be had from the following description, given by way of example in conjunction with the accompanying drawings wherein.

DETAILED DESCRIPTION OF THE EMBODIMENTS

Hereinafter is a description of embodiments of a method and of circuitry for electronically computing, or determining, the square root of a number. The method and circuitry are based on a new process as set forth hereinafter. Embodiments of the method include an iteration described by Equation 2:

$$P_{i+1} = r \cdot P_i - q_{i+1} \cdot 2Q_i - (q_{i+1})^2 \cdot r^{(i+1)} \quad \text{(Equation 2)}$$

A method based on Equation 2, described hereinafter, may be implemented using one processor cycle per iteration instead of two, resulting in a significant reduction in computational speed and latency.

In Equation 2, $P_{i+1}$ represents a new partial remainder, determined using a previously determined partial remainder $P_i$. The symbol $Q_i$ represents a current solution, that is, an approximation to the square root obtained in an $i^{th}$ iteration. The symbol $q_{i+1}$ represents an additional digit of precision to the solution, also called a quotient digit, that is to be used to form the next current solution. The symbol $(q_{i+1})^2$ represents the square of $q_{i+1}$. The symbol r represents a radix used in a given embodiment of the method. These symbols are explained in greater detail hereinafter.

Figure 1:
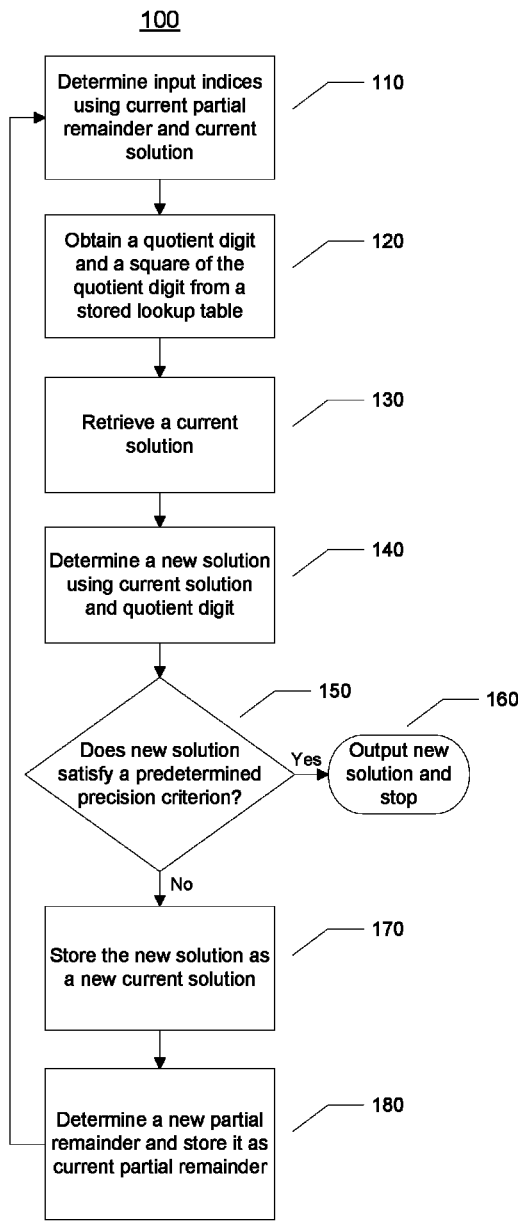
FIG. 1 shows an embodiment of a method for determining a square root

FIG. 1 shows an embodiment 100 of a method, performed by a processor, of determining a square root. The embodiment shown in FIG. 1, and described hereinafter, is not to be construed as limiting. In alternative embodiments the order of various steps may be changed without necessarily departing from the scope defined in the appended claims. Each iteration of the method 100 is performed in a single processor cycle. In each iteration, input indices are determined 110. The input indices are presented to a stored lookup table. Values of quotient digit $q_{i+1}$, and its square $(q_{i+1})^2$, are obtained from the stored lookup table 120, where $q_{i+1}$ and $(q_{i+1})^2$ correspond to the input indices. Obtaining both $q_{i+1}$ and $(q_{i+1})^2$ directly from a lookup table enables completing each iteration in a single processor cycle.

The method embodiment of FIG. 1 is initiated by obtaining initial values (not shown) from a seed lookup table. One of these is an initial value of a quotient digit and another is an initial value of the square of the quotient digit. Indices presented to the seed lookup table include the radicand, the number for which a square root is to be determined. In each subsequent cycle, input indices to the stored lookup table are determined from results obtained in the previous cycle (partial remainder $P_i$ and current solution $Q_i$).

After input indices are determined, either initially or subsequently, as in 110, the next digit of precision, or quotient digit, $q_{i+1}$ and its square $(q_{i+1})^2$ are both obtained from a lookup table 120. In general, a quotient digit may be selected from the range $\{-(r-1), (r-1)\}$. For example, with radix-8 this range would be $\{-7,-6,-5,-4,-3,-2,-1,0,1,2,3,4,5,6,7\}$. A current solution $Q_i$, an approximation to the desired square root, is also retrieved, 130. A new solution, which is a next approximation of the desired square root, is determined using the current solution and the new quotient digit $q_{i+1}$ 140. If the quotient digit $q_{i+1}$ is positive, the new solution $Q_{i+1}$ may be determined by appending the quotient digit $q_{i+1}$ to the digits of the current solution $Q_i$. If $q_{i+1}$ is negative, the new solution $Q_{i+1}$ may be determined by appending the absolute value of the quotient digit, $|q_{i+1}|$, to the digits of the current solution minus 1, $Q_i-1$. The number $Q_i-1$ can be maintained and stored during execution just as $Q_i$ is maintained and stored. The radix may be 2, 4, 8, or an integer greater than 8. A more familiar example corresponding to this determining of new solution $Q_{i+1}$ occurs in long division, where, in each iteration (using radix 10), a new "decimal place" is determined and appended to a current solution.

Once a new solution is determined, a determination is made of whether the new solution satisfies a predetermined precision criterion 150. Again, making an analogy with long division, a predetermined precision criterion may correspond to a desired number of computed decimal places in the final result. If the new solution satisfies the predetermined precision criterion 150, then the new solution is output and the method stops 160.

If the new solution does not satisfy the predetermined precision criterion, the method 100 continues. The new solution is stored as a new current solution 170 so that it may be used in the next iteration. A new partial remainder $P_{i+1}$ is determined based on Equation 2 and stored as a current partial remainder 180. The method 100 then returns to 110. The stored current partial remainder and the stored current solution are retrieved and are used to determine the next set of input indices to the lookup table 110. New values of the quotient digit and the square of the quotient digit are obtained from the stored lookup table using the next set of input indices 120, and the method 100 repeats until the new solution satisfies the predetermined precision criterion 150, 160.

Figure 2:
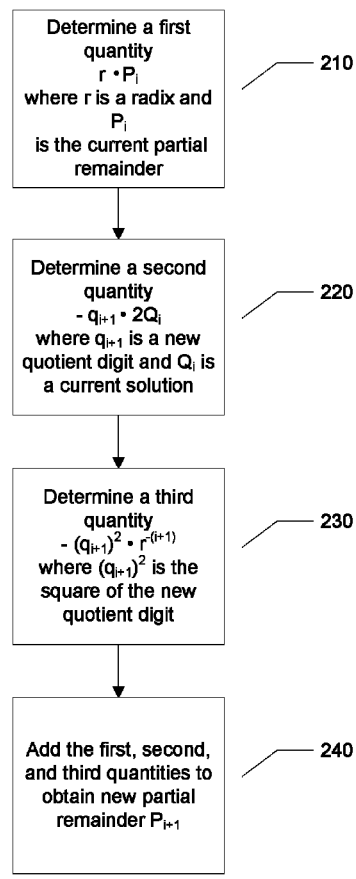
FIG. 2 shows additional details of an embodiment for determining a square root.

FIG. 2 shows an embodiment of a method for determining a new partial remainder based on Equation 2. The embodiment shown in FIG. 2, and described hereinafter, is not to be construed as limiting. In alternative embodiments, the order of various steps may be changed without necessarily departing from the scope defined in the appended claims. In 210, a first quantity $r \cdot P_i$ is determined, where r is a radix and $P_i$ is the current partial remainder (Note that multiplying by r is just a simple fixed shift-left). In 220, a second quantity $-q_{i+1} \cdot 2Q_i$ is determined, where $q_{i+1}$ is a new quotient digit and $Q_i$ is a current solution. The multiplication is carried out with careful attention to reducing the time required. This may be accomplished by reducing the number of items to be added. For example, in radix 8, if $q_{i+1}$ is 7, the desired product $7 \cdot 2Q_i$ may be broken down into $8 \cdot 2Q_i - 1 \cdot 2Q_i$. Multiplication by 8 is just a shift-left of $2Q_i$ by three places, and multiplication by 1 is just $2Q_i$ itself. All multiples in the range $\{-7 \ldots 7\}$ used with radix 8 can be generated in similar manner by carefully choosing two shifted versions of $Q_i$ from $(+/-8 \cdot, 4 \cdot, 0 \cdot)$ and $(+/-2 \cdot, 1 \cdot, 0 \cdot)$.

In 230, a third quantity $(q_{i+1})^2 \cdot r^{(i+1)}$ is determined, where $(q_{i+1})^2$ is the square of the next quotient digit. Again, both $q_{i+1}$ and $(q_{i+1})^2$ are obtained from a lookup table. The first, second, and third quantities are added to obtain the new partial remainder $P_{i+1}$ 240.

In the determination of the third quantity, $(q_{i+1})^2 \cdot r^{(i+1)}$, the multiplication by $r^{(i+1)}$ is effectively a shift to the right. For example if the radix r is 8, this multiplication is a shift of 3 bits for the first iteration with i=0, 6 bits for the second iteration, 9 bits for the third iteration, etc. For better timing, a shifter for this purpose may be implemented as, for example, a mask vector and a mux, such as a 2:1 mux.

Determining a new partial remainder as shown in FIG. 2 may also require determining a growing sign extension vector. Since $-(q_{i+1})^2$ is always negative, the sign-extension vector provides the leading ones to form the two's complement. As $(q_{i+1})^2$ keeps shifting to the right by, for example, three bits with radix 8, the sign-extension vector has to keep pace by shifting right three ones, thus maintaining the true value of the $-(q_{i+1})^2$ in two's complement format.

Figure 3:
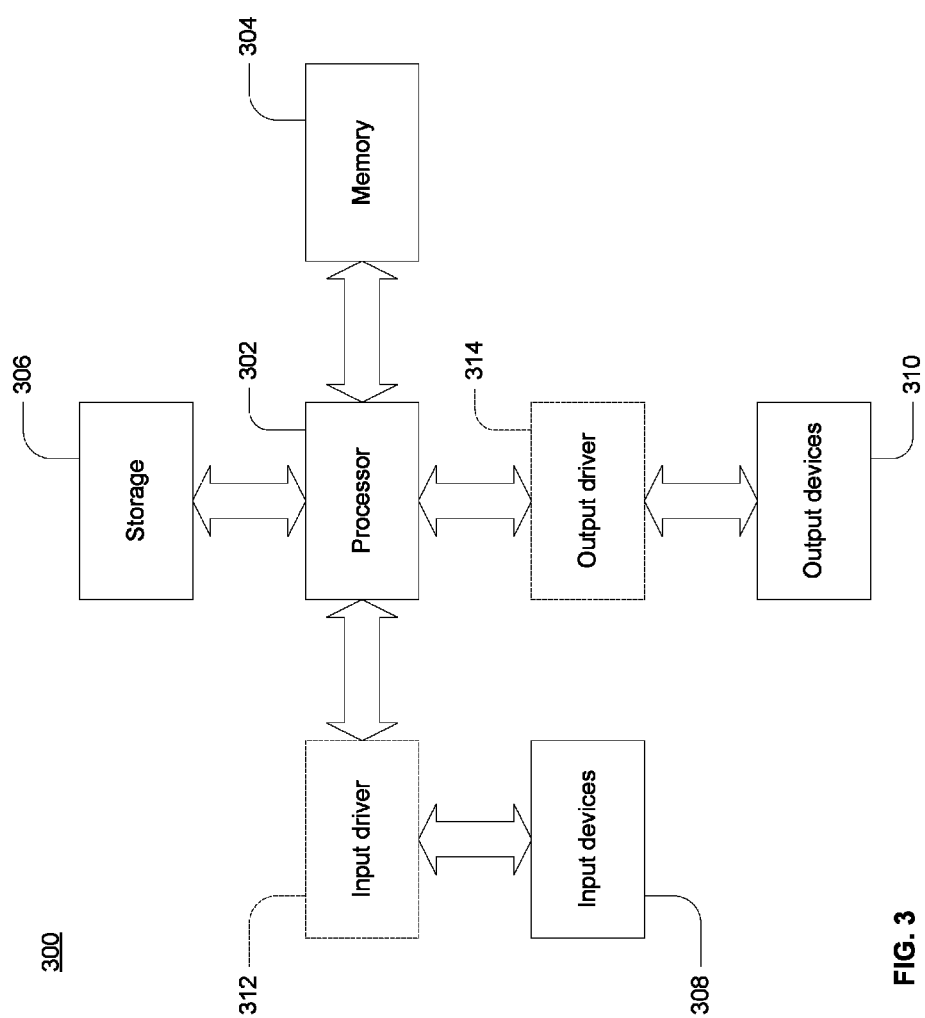
FIG. 3 shows a block diagram of an embodiment of circuitry configured to determine a square root.

FIG. 3 is a block diagram of an example device 300 in which one or more disclosed embodiments may be implemented. The device 300 may include, for example, a computer, a gaming device, a handheld device, a set-top box, a television, a mobile phone, or a tablet computer. The device 300 includes a processor 302, a memory 304, a storage 306, one or more input devices 308, and one or more output devices 310. The device 300 may also optionally include an input driver 312 and an output driver 314. It is understood that the device 300 may include additional components not shown in FIG. 3.

The processor 302 may include a central processing unit (CPU), a graphics processing unit (GPU), a CPU and GPU located on the same die, or one or more processor cores, wherein each processor core may be a CPU or a GPU. The memory 304 may be located on the same die as the processor 302, or may be located separately from the processor 302. The memory 304 may include a volatile or non-volatile memory, for example, random access memory (RAM), dynamic RAM, or a cache.

The storage 306 may include a fixed or removable storage, for example, a hard disk drive, a solid state drive, an optical disk, or a flash drive. The input devices 308 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 310 may include a display, a speaker, a printer, a haptic feedback device, one or more lights, an antenna, or a network connection (e.g., a wireless local area network card for transmission and/or reception of wireless IEEE 802 signals).

The input driver 312 communicates with the processor 302 and the input devices 308, and permits the processor 302 to receive input from the input devices 308. The output driver 314 communicates with the processor 302 and the output devices 310, and permits the processor 302 to send output to the output devices 310. It is noted that the input driver 312 and the output driver 314 are optional components, and that the device 300 will operate in the same manner if the input driver 312 and the output driver 314 are not present.

Device 300 may include circuitry configured to determine a square root in a single cycle according to an embodiment of a method described hereinbefore. Processor 302 may be configured to perform the method embodiments shown in FIGS. 1 and 2 and described hereinbefore. Memory 304 may be used to store one or more lookup tables containing values of a quotient digit and its square $(q_{i+1})^2$. Memory 304 may also be used to store a current solution $Q_i$, new solution $Q_{i+1}$ and partial remainders $P_i$ and $P_{i+1}$. Memory 304 may be used to store a seed lookup table, as described hereinbefore.

Figure 4:
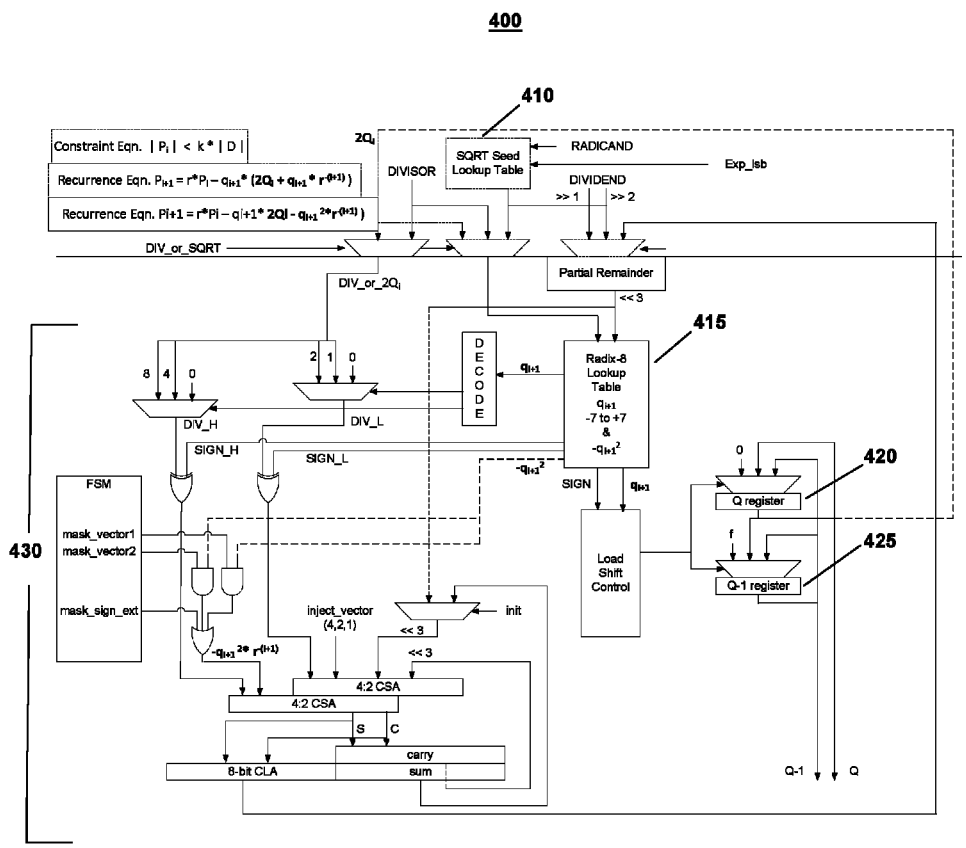
FIG. 4 shows a detailed block diagram of an embodiment of circuitry configured to determine a square root.

FIG. 4 shows a detailed block diagram 400 of an embodiment of circuitry configured to determine a square root using radix 8. Examples of the following components, described hereinbefore, are indicated: seed lookup table 410, lookup table for quotient digit $q_{i+1}$ and square of the quotient digit $(q_{i+1})^2$ 415, Q register for storing a current solution 420, Q−1 register for storing a current solution minus one 425, and circuitry for determining terms to be added to determine a partial remainder 430.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the present invention.

The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method, performed by a processor, of determining a square root, the method comprising, in a single processor cycle:
    obtaining, from a stored lookup table, a quotient digit and a square of the quotient digit;
    retrieving a current solution; and
    determining a new solution using the current solution and the quotient digit.

2. The method of claim 1, wherein obtaining, from a stored lookup table, a quotient digit and a square of the quotient digit comprises:
    retrieving a current partial remainder; and
    determining input indices to the lookup table using the current partial remainder and the current solution.

3. The method of claim 2, further comprising:
    determining a new partial remainder; and
    storing the new partial remainder as a new current partial remainder; wherein the determining of a new partial remainder comprises:
        determining a first quantity $r \cdot P_i$, where r is a radix and $P_i$ is the current partial remainder;
        determining a second quantity $-q_{i+1} \cdot 2Q_i$, where $q_{i+1}$ is a new quotient digit and $Q_i$ is the current solution;
        determining a third quantity $-(q_{i+1})^2 \cdot r^{(i+1)}$, where $(q_{i+1})^2$ is the square of the new quotient digit; and
        adding the first, second, and third quantities to obtain the new partial remainder.

4. The method of claim 3, further comprising:
    determining whether the new solution satisfies a predetermined precision criterion; and
    if the new solution does not satisfy the predetermined precision criterion, then:
        storing the new solution as a new current solution; and
        repeating, in a single processor cycle:
            the obtaining of a new quotient digit and a square of the new quotient digit;
            the retrieving of the current solution; and
            the determining of a new solution.

5. The method of claim 3, wherein the determining of the third quantity comprises using a mask vector and a mux to emulate a shifter.

6. The method of claim 3, wherein the determining of the third quantity comprises determining a growing sign extension vector.

7. The method of claim 3, wherein the radix is one of 2, 4, 8, or an integer greater than 8.

8. The method of claim 1, comprising obtaining an initial value of the quotient digit and an initial value of the square of the quotient digit from a seed lookup table.

9. The method of claim 1, wherein determining a new solution using the current solution and the quotient digit comprises:
    appending the quotient digit to digits of the current solution if the quotient digit is positive; and
    appending the absolute value of the quotient digit to the digits of the current solution minus 1 if the quotient digit is negative.

10. Circuitry configured to determine a square root in a single cycle, comprising:
    a processor; and
    a memory containing at least one stored lookup table;
    wherein the processor is configured to perform, in a single cycle:
        obtaining, from the stored lookup table, a quotient digit and a square of the quotient digit;
        retrieving a current solution from the memory; and
        determining a new solution using the current solution and the quotient digit.

11. The circuitry of claim 10, wherein the processor is configured to obtain the new quotient digit and the square of the new quotient digit by:
    retrieving a current partial remainder from the memory; and
    determining input indices to the lookup table using the current partial remainder and the current solution.

12. The circuitry of claim 11, wherein the processor is further configured to:
    determine a new partial remainder; and
    store the new partial remainder in the memory as a new current partial remainder;
    wherein the processor is configured to determine the new partial remainder by:
        determining a first quantity $r \cdot P_i$, where r is a radix and $P_i$ is the current partial remainder;
        determining a second quantity $-q_{i+1} \cdot 2Q_i$, where $q_{i+1}$ is a new quotient digit and $Q_i$ is the current solution;
        determining a third quantity $-(q_{i+1})^2 \cdot r^{(i+1)}$, where $(q_{i+1})^2$ is the square of the new quotient digit; and
        adding the first, second, and third quantities to obtain the new partial remainder.

13. The circuitry of claim 12, wherein the processor is further configured to:
    determine whether the new solution satisfies a predetermined precision criterion; and
    if the new solution does not satisfy the predetermined precision criterion, then:
        store the new solution in the memory as a new current solution; and
        repeat, in a single processor cycle:
            the obtaining of a new quotient digit and a square of the new quotient digit;
            the retrieving of the current solution; and
            the determining of a new solution.

14. The circuitry of claim 12, wherein the processor is configured to determine the third quantity using a mask vector and a mux to emulate a shifter.

15. The circuitry of claim 12, wherein the processor is configured to determine the third quantity using a growing sign extension vector.

16. The circuitry of claim 12, wherein the processor is configured to operate with the radix being one of 2, 4, 8, or an integer greater than 8.

17. The circuitry of claim 10, wherein the processor is configured to obtain an initial value of the quotient digit and an initial value of the square of the quotient digit from a seed lookup table stored in the memory.

18. The circuitry of claim 10, wherein the processor is configured to determine a new solution using the current solution and the quotient digit by:
    appending the quotient digit to digits of the current solution if the quotient digit is positive; and
    appending the absolute value of the quotient digit to the digits of the current solution minus 1 if the quotient digit is negative.

19. The circuitry of claim 10, wherein the memory and the processor are both located on a single die.

20. A non-transitory computer-readable storage medium comprising instructions and data that are acted upon by a program executable on a computer system, the program operating on the instructions and data to perform a portion of a process to fabricate an integrated circuit including circuitry described by the data, the circuitry described by the data configured to perform a method of calculating a square root, the method comprising, in a single processor cycle:
   obtaining, from a stored lookup table, a quotient digit and a square of the quotient digit;
   retrieving a current solution; and
   determining a new solution using the current solution and the quotient digit.

21. A non-transitory computer-readable storage medium comprising instructions and data that are acted upon by a program executable on a computer system, the program operating on the instructions and data to perform a portion of a process to fabricate an integrated circuit including circuitry described by the data, the circuitry described by the data comprising:
   a processor; and
   a memory containing at least one stored lookup table;
   wherein the processor is configured to perform, in a single cycle:
      obtaining, from the stored lookup table, a quotient digit and a square of the quotient digit;
      retrieving a current solution from the memory; and
      determining a new solution using the current solution and the quotient digit.

\* \* \* \* \*

UNITED STATES PATENT AND TRADEMARK OFFICE
CERTIFICATE OF CORRECTION

| | |
|---|---|
| PATENT NO. | : 8,868,633 B2 |
| APPLICATION NO. | : 13/436555 |
| DATED | : October 21, 2014 |
| INVENTOR(S) | : Lemonds et al. |

It is certified that error appears in the above-identified patent and that said Letters Patent is hereby corrected as shown below:

IN THE CLAIMS

Claim 3, column 5, line 32, change "$-(q_{i+1})^2 \cdot r^{(i+r)}$" to -- $-(q_{i+1})^2 \cdot r^{-(i+r)}$ --.
Claim 12, column 6, line 30, change "$-(q_{i+1})^2 \cdot r^{(i+r)}$" to -- $-(q_{i+1})^2 \cdot r^{-(i+r)}$ --.

Signed and Sealed this
Tenth Day of February, 2015

Michelle K. Lee
*Deputy Director of the United States Patent and Trademark Office*